United States Patent [19]

Sato

[11] 4,087,640
[45] May 2, 1978

[54] DATA INPUT CONTROL SYSTEM

[75] Inventor: Kazuyuki Sato, Green Heim Koganei, Japan

[73] Assignee: Tokyo Shibaura Electric Co., Ltd., Japan

[21] Appl. No.: 715,141

[22] Filed: Aug. 17, 1976

[30] Foreign Application Priority Data

Aug. 21, 1975 Japan .................. 50-101497

[51] Int. Cl.² ............................................. H04J 3/04
[52] U.S. Cl. ..................................... 179/15 A; 178/50
[58] Field of Search ................... 179/15 BL, 15 A; 340/173 ST

[56] References Cited

U.S. PATENT DOCUMENTS

| | | | |
|---|---|---|---|
| 3,821,477 | 6/1974 | Hotta | 179/15 A |
| 3,821,480 | 6/1974 | Dundon et al. | 179/15 A |
| 3,952,298 | 4/1976 | Winkelmann et al. | 179/15 A |

Primary Examiner—Thomas A. Robinson
Attorney, Agent, or Firm—Oblon, Fisher, Spivak, McClelland & Maier

[57] ABSTRACT

A data input control system which provides a processor with control data including micro-instructions from a control storage on a time-division basis. The processor and the control storage are respectively integrated on one-chip semiconductor devices. The data input control system is effective for reducing the number of necessary terminals on the one-chip semiconductor device for the processor.

4 Claims, 4 Drawing Figures

DATA INPUT CONTROL SYSTEM

BACKGROUND OF THE INVENTION

1. Field of the Invention

This invention relates generally to a data processing system, and more particularly to a data input control system for providing a processor with control data from a control storage.

2. Description of the Prior Art

Processors integrated on a one-chip semiconductor are adapted for use in various fields. There are two kinds of conventional data processing systems including such processors. In the first one, shown in FIG. 1A, a processor 2 includes a control storage (ROM) 1 therein. This type of processor does not necessarily have the flexibility of a program control system and, thus, it is only applicable to restricted fields because of the relatively small capacity and unchangeability of the control storage.

The second type of system, shown in FIG. 1B, comprises a processor 3 and a control storage (ROM) 4 located outside the processor 3 and connected therewith through ROM address lines 5 and ROM data lines 6, wherein the processor 3 and the control storage 4 are respectively integrated on one-chip semiconductor devices. However, it is unavoidable that a large number of terminals of the processor 3 are required for connecting with the ROM address and data lines 5 and 6.

If the number of the ROM address lines 5, which depends on the memory space of the control stage 4, is 11, for example, and that of the ROM data lines 6, which depends on read-out data lengths of the control storage 4, is 16, then the total number of the terminals used for them will be 27 in spite of the fact that only 42 terminals (pins), for example, are provided on one-chip semiconductor devices for conventional processors of this type. Therefore, the number of terminals that can be used for data processing purposes, other than the ROM address and data lines 5 and 6, are substantially reduced, resulting in functional deteriorations of the data processing system.

It may be considered that the number of the terminals on the processor 3 could be increased in order to overcome such functional deteriorations, but this leads to a large chip size for the processor 3 and does not meet required standards or functions thereof.

SUMMARY OF THE INVENTION

It is accordingly one object of this invention to provide a new and improved data input control system for a processor integrated on a one-chip semiconductor device.

It is another object of this invention to provide a data input control system for economizing on the number of necessary terminals of a processor without functional deteriorations thereof.

It is a further object of this invention to provide a data input control system for supplying control data from a control storage to a processor on a time-division basis.

Briefly stated, these and other objects are achieved by a data input control system according to this invention wherein a processor is provided with control data from a control storage in one memory cycle time of the control storage on a time-division basis.

BRIEF DESCRIPTION OF THE DRAWINGS

The exact nature of this invention, as well as other objects and advantages thereof, will be readily apparent from consideration of the following specification in conjunction with the attached drawings in which.

DESCRIPTION OF THE PREFERRED EMBODIMENT

A data input control system in accordance with this invention provides a processor with control data from a control storage in a memory cycle time thereof on a time-division basis, thereby reducing the number of the required terminals of the processor. The number (C) of terminals for handling the control data is determined as follows:

$$A < T < B \tag{1}$$
$$T \times n = B \text{ (n; an integer)} \tag{2}$$
$$[D/n] = \begin{cases} C; & \text{(if there is not any remainder)} \\ C-1; & \text{(if there is a remainder)} \end{cases} \tag{3}$$

wherein $A$ is the access time of the control storage;

$B$ is the memory cycle time of the control storage;

$C$ is the number of control data input terminals of the processor;

$D$ is the bit length of the control data;

$n$ is the number of division times (frequency) of the control data in one memory cycle; and, $T$ is the period of a clock pulse of the data input control system.

It is assumed in one embodiment of this invention that $A = 50\ n$ sec., $B = 400\ n$ sec., $C = 4$ $D = 16$ bits, $n = 4$, and $T = 100\ n$ sec.

Figure 1A:
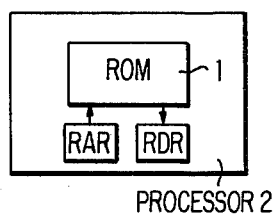
FIGS. 1A and 1B are block diagrams of prior art data processing systems.
Figure 1B:
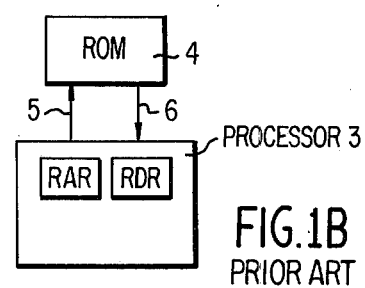
Figure 2:
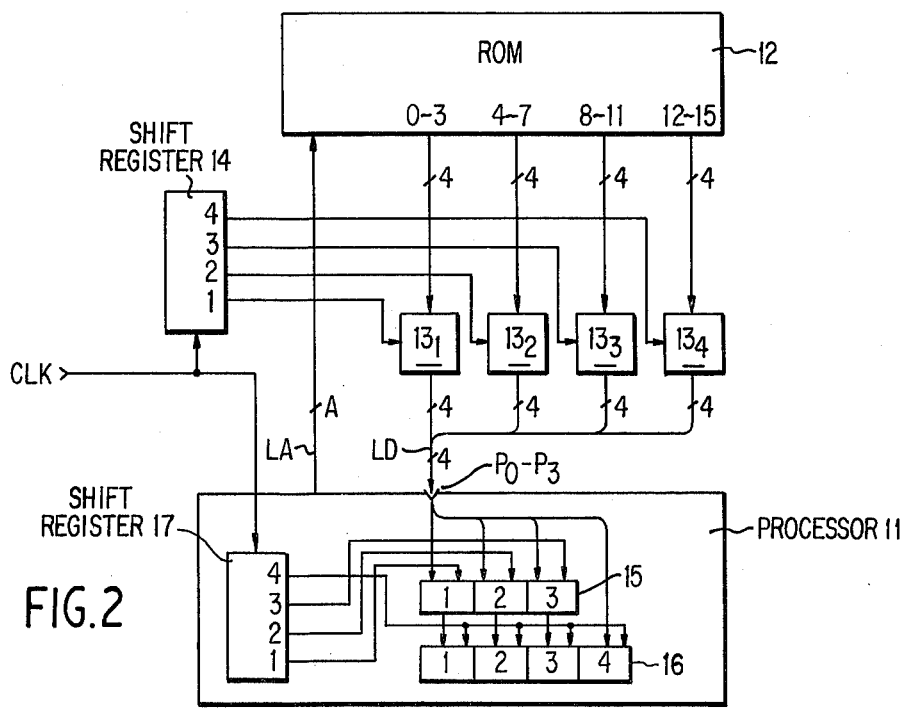
FIG. 2 is a block diagram of a data input control system according to this invention; and, FIG. 3 is a waveform diagram of the data input control system shown in FIG. 2.

Referring to FIG. 2, a data input control system provides a processor 11 integrated on a one-chip semiconductor device receiving control data from a control storage or ROM 12 integrated on another one-chip semiconductor device. The control data comprises 16-bit data including micro-instructions, and the control storage 12 has 16 output terminals for the control data.

The control data are divided four groups, wherein each group comprises 4-bit lengths of bit positions 0–3, 4–7, 8–11, or 12–15. The memory cycle time of the control storage 12 is, as described above, preferably 400 $n$ sec. Gates $13_1$, $13_2$, $13_3$ and $13_4$ supply the control data to the processor 11 under the control of a 4-bit shift register 14. The shift register 14 receives a clock pulse and sequentially enables the gates $13_1$, $13_2$, $13_3$ and $13_4$. The duration of the clock pulse, generated by an oscillator (not shown), is 100 $n$ sec.

The processor includes a 4-bit shift register 17 with the same function as the shift register 14, a 3-stage buffer register 15 with 4-bit lengths per stage, and a 4-stage ROM data register 16 with a 4-bit lengths per stage. The 4-input terminals $P_0 - P_3$ of the processor 11 are used for receiving the control data. The input terminals $P_0 - P_3$ are connected with the gates $13_1$, $13_2$, $13_3$ and $13_4$ through ROM data lines (LD). ROM address information is supplied from the processor 11 to the control storage 12 through ROM address lines (LA).

The access time of the control storage is 50 $n$ sec. in this embodiment. The operation of the data input control system will be described hereinafter with reference to the waveforms thereof shown in FIG. 3, wherein (a) shows a clock pulse, and (b), (c), (d), and (e) show outputs of each stage of the shift registers 14 through 17, respectively.

Figure 3:
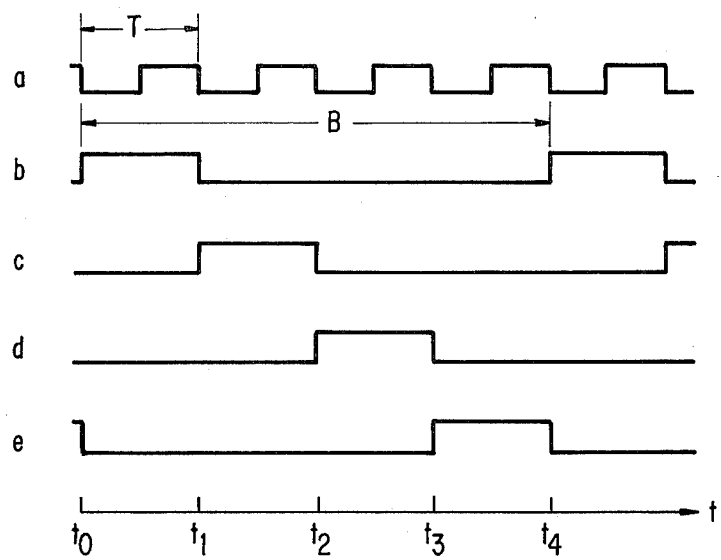

When the first bit of the shift register rises as shown in FIG. 3 (b) in accordance with the clock pulse shown in FIG. 3 (a), the control data are read out from the control storage 12 in response to the ROM address information. The 16-bit control data are divided into four groups to be supplied to gates $13_1$, $13_2$, $13_3$ and $13_4$, respectively. During the high level duration $(t_0-t_1)$ of the first bit of the first shift register 14, the gate $13_1$ is enabled to supply the first group (bit positions 0–3) of the control data to the terminals $P_0 - P_3$ of the processor 11 through the ROM data line (LD). The first group of control data is then stored in the first stage of the buffer register 15 at $t = t_1$ under the control of the second shift register 17 in synchronization with the operation of the first shift register 14.

Subsequently, when the second bit of the first shift register 14 is at the high level as shown in FIG. 3 (c), the gate $13_2$ passes the second group (bit positions 4–7) of the control data to the terminals $P_0 - P_3$. The second group of the control data is then stored in the second stage of the buffer register 15 at $t = t_2$. Further, the third group (bit positions 8–11) of the control data is stored in the third stage of the buffer register 15 at $t = t_3$ under the same control sequence as described above. However, the fourth group (bit positions 12–15) of the control data is directly stored in the fourth stage of the ROM data register. Concurrently, the contents of the buffer register 15 are respectively transferred to the corresponding stages of ROM data register 16. Therefore, the same control data as derived from the control storage 12 are stored in the ROM data register 16 in the memory cycle time of 400 $n$ sec.

While one typical embodiment of the invention has been described with reference to a specific input data control system, it is obvious that other systems may be adapted to utilize this invention in order to obtain the same advantages. For example, an auxiliary control storage may be formed in the processor in addition to the control storage 12. Further, the buffer register 15 may be removed when the ROM data register 16 stores sequentially the control data in response to outputs of the shift register 17 and the contents of the ROM data register 16 are transferred to logic circuits in the processor 11 under the control of the fourth output of this shift register 17.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data input control system for reducing the number of terminals required by a processor without reducing the functionality of said processor comprising:
 a control storage means for storing control data integrated on a one-chip semiconductor device,
 a processor means integrated on another one-chip semiconductor device having input terminals for receiving said control data,
 means for generating a clock pulse,
 gating means for supplying said control data read out from said control storage to said processor means in response to said clock pulse,
 means for controlling said gating means on a time-division basis satisfying the following relationships $$A < T < B, T \times n = B, (n; \text{ an integer})$$

$$\frac{D}{n} = \left\{ \begin{array}{l} C; \text{ (if there is not any remainder)} \\ C\text{-}1; \text{ if there is a remainder} \end{array} \right\}$$

wherein
 $A$ is the access time of said control storage;
 $B$ is the memory cycle time of said control storage;
 $C$ is the number of control data input terminals of said processor;
 $D$ is the bit length of said control data;
 $n$ is the number of division times of said control data in said memory cycle time B; and,
 $T$ is the period of said clock pulse;
 means for storing said control data in said processor in synchronization with the operation of said control means, and
 means for accessing said control storage means in order to read said control data.

2. A data input control system according to claim 1, wherein:
 said controlling means includes a first shift register driven by said clock pulse; and,
 said storing means includes a second shift register driven by said clock pulse and a buffer register for sequentially storing said control data in synchronization with the operation of said second shift register.

3. A data input control system according to claim 2 wherein:
 said first and second shift registers are $n$-bit registers, said buffer register comprises an $(n\text{-}1)$-stage register with C-bit lengths per stage.

4. A data input control system according to claim 2, wherein:
 said processor further includes a control data register for storing said control data in synchronization with the operation said second shift register.

* * * * *